US009158079B2

(12) United States Patent
Yasuda et al.

(10) Patent No.: US 9,158,079 B2
(45) Date of Patent: Oct. 13, 2015

(54) OPTICAL MODULE, OPTICAL COMMUNICATION EQUIPMENT, AND OPTICAL TRANSMISSION DEVICE

(71) Applicant: Hitachi Metals, Ltd., Tokyo (JP)

(72) Inventors: Hiroki Yasuda, Mito (JP); Kouki Hirano, Hitachinaka (JP); Takumi Kobayashi, Hitachi (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 14/183,295

(22) Filed: Feb. 18, 2014

(65) Prior Publication Data

US 2014/0294340 A1   Oct. 2, 2014

(30) Foreign Application Priority Data

Mar. 26, 2013   (JP) ................................ 2013-064046

(51) Int. Cl.
*G02B 6/36* (2006.01)
*H04B 10/00* (2013.01)
*G02B 6/42* (2006.01)

(52) U.S. Cl.
CPC .............. *G02B 6/428* (2013.01); *G02B 6/4214* (2013.01); *G02B 6/4257* (2013.01); *G02B 6/423* (2013.01); *G02B 6/4267* (2013.01)

(58) Field of Classification Search
CPC .. G02B 6/4214; G02B 6/3887; G02B 6/4244; G02B 6/4242
USPC ........................ 385/88, 92; 398/135, 138, 139
See application file for complete search history.

(56) References Cited

U.S. PATENT DOCUMENTS

| | | | | |
|---|---|---|---|---|
| 6,084,419 A | * | 7/2000 | Sato et al. | 324/750.03 |
| 6,821,027 B2 | * | 11/2004 | Lee et al. | 385/89 |
| 7,215,886 B2 | * | 5/2007 | Maruyama et al. | 398/117 |
| 7,820,462 B2 | * | 10/2010 | Rolston et al. | 438/29 |
| 8,267,597 B2 | * | 9/2012 | Sasaki | 385/88 |
| 2004/0202477 A1 | * | 10/2004 | Nagasaka et al. | 398/138 |
| 2008/0138007 A1 | * | 6/2008 | Okubo et al. | 385/14 |
| 2009/0214156 A1 | * | 8/2009 | Okubo et al. | 385/14 |
| 2010/0129037 A1 | * | 5/2010 | Nakagawa et al. | 385/92 |

FOREIGN PATENT DOCUMENTS

JP   2011-095295 A   5/2011

* cited by examiner

*Primary Examiner* — Robert Tavlykaev
(74) *Attorney, Agent, or Firm* — McGinn IP Law Group, PLLC.

(57) ABSTRACT

An optical module includes a circuit board, an optical element on the circuit board, a semiconductor circuit element thereon and electrically coupled with the optical element, an optical connection member formed on a back surface of the circuit board and including an optical fiber receiving groove, and a pressing plate disposed on a side opposite to the circuit board of the optical connection member so as to fix the optical fiber. The semiconductor circuit element is mounted nearer a tip side of the circuit board in relation to the optical element such that the circuit board, the optical connection member and a tip part of the optical fiber are sandwiched between the semiconductor circuit element and the pressing plate. The circuit board includes a plurality of electrodes to be electrically coupled with an equipment side circuit board formed on a tip part of a back surface of the circuit board.

20 Claims, 3 Drawing Sheets

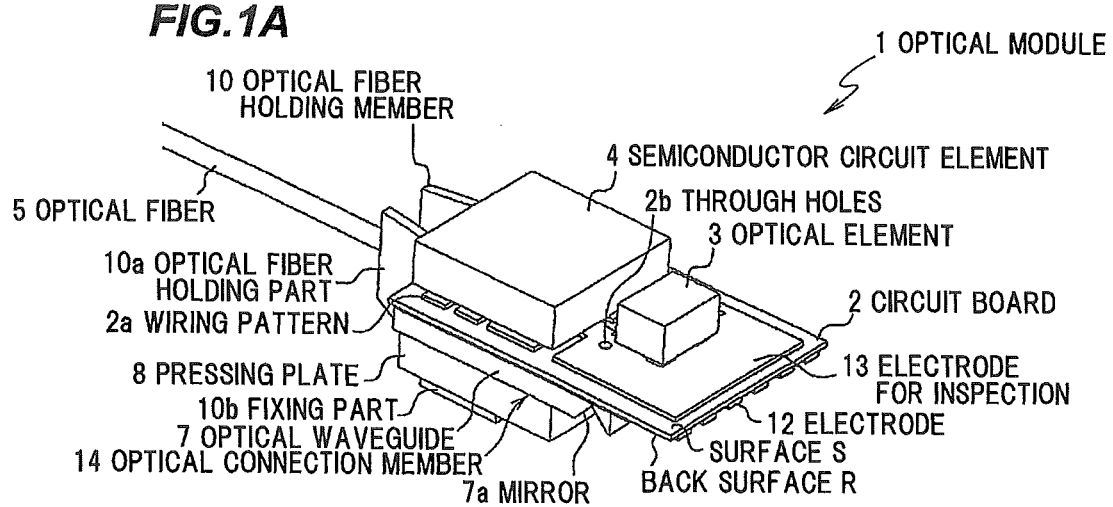
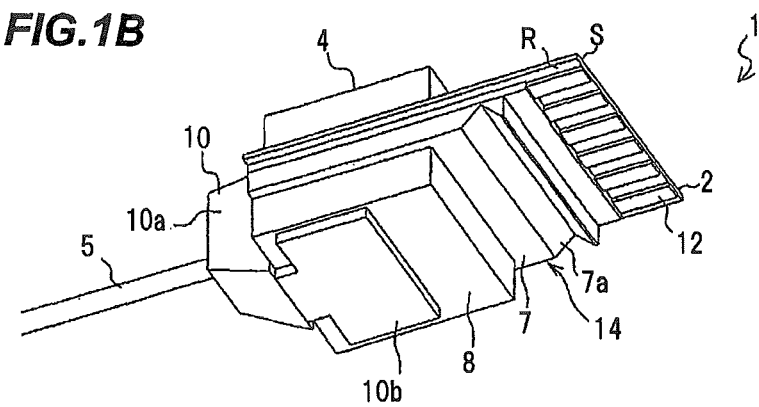
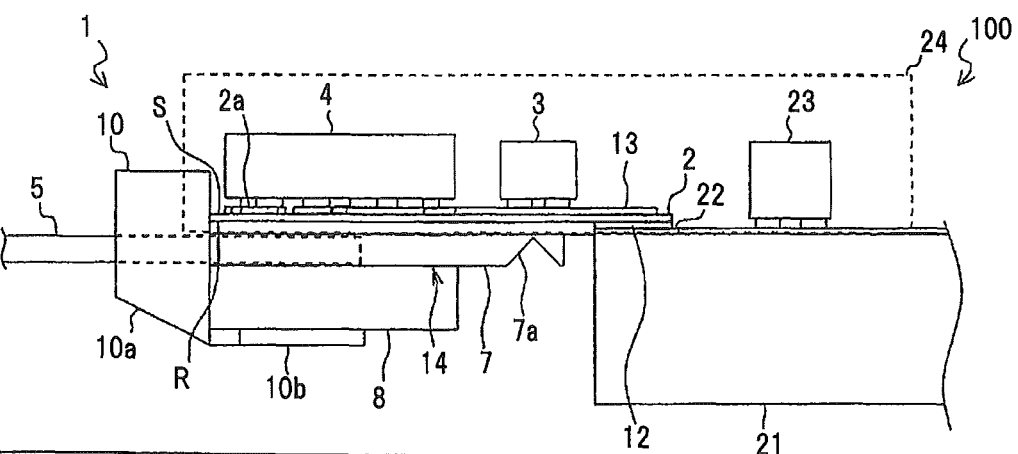

51 OPTICAL MODULE

61 OPTICAL MODULE

OPTICAL MODULE, OPTICAL COMMUNICATION EQUIPMENT, AND OPTICAL TRANSMISSION DEVICE

The present application is based on Japanese patent application No. 2013-064046 filed on Mar. 26, 2013, the entire contents of which are incorporated herein by reference.

BACKGROUND OF THE INVENTION

1. Field of the Invention

The invention relates to an optical module, an optical communication equipment using the optical module, and an optical transmission device using the optical module.

2. Description of the Related Art

An optical module is known which converts an electrical signal input from an equipment etc. to an optical signal and outputs it to an optical fiber, or which converts the optical signal input from the optical fiber to the electrical signal and outputs it to the equipment etc.

As an example of the optical module, an optical module is known which comprises a lens block having a lens or a mirror, an optical fiber, and an optical element, and the lens block set facing a light emitting part or a light receiving part of the optical element, and the optical fiber is optically coupled with the optical element via the lens block.

Prior art documents related to the invention of this application may include JP-A-2011-095295.

SUMMARY OF THE INVENTION

In recent years an optical module has been used in various uses and, depending on the uses, it may be strongly desired to downsize an optical module. For examples, even by a subminiature camera etc. for commercial use, it is not possible to secure a sufficient storage space for the optical module. Thus, a subminiature optical module downsized to size of around several millimeters may be desired.

But it is difficult to realize such a subminiature optical module as described above because there is a limit to downsize the optical module comprising the lens block.

It is an object of this invention to provide an optical module that can realize further downsizing, as well as an optical communication equipment and an optical transmission device using the optical module.

(1) According to one embodiment of the invention, an optical module comprises:

a circuit board;

an optical element mounted on a surface of the circuit board;

a semiconductor circuit element mounted on a surface of the circuit board and electrically coupled with the optical element;

an optical connection member formed on a back surface of the circuit board and comprising an optical fiber receiving groove for enclosing a tip part of an optical fiber inserted through an end side of the circuit board and optically coupling the optical fiber received in the optical fiber receiving groove with the optical element; and a pressing plate disposed on a side opposite to the circuit board of the optical connection member so as to fix the optical fiber while enclosing the optical fiber in the optical fiber receiving groove, wherein the semiconductor circuit element is mounted nearer a tip side of the circuit board in relation to the optical element such that the circuit board, the optical connection member and a tip part of the optical fiber are sandwiched between the semiconductor circuit element and the pressing plate, and wherein the circuit board comprises a plurality of electrodes to be electrically coupled with an equipment side circuit board formed on a tip part of a back surface of the circuit board.

In the above embodiment (1) of the invention, the following modifications and changes can be made.

(i) A difference in coefficient of thermal expansion between the semiconductor circuit element and the pressing plate is not more than 20 ppm.

(ii) The pressing plate is disposed so as to extend at least from a position facing the semiconductor circuit element to a position facing the optical element.

(iii) The pressing plate is disposed such that a tip surface thereof contacts the equipment side circuit board in electrically coupling the electrodes with the equipment side circuit board.

(iv) The circuit board further comprises an electrode for inspection used for inspecting the optical element or the semiconductor circuit element formed on a surface thereof.

(v) The circuit board is formed into a rectangle of not more than 3 mm on a side, and wherein a length of the electrode is not more than 0.5 mm.

(2) According to another embodiment of the invention, an optical communication equipment comprises the optical module and the equipment side circuit board according to the above embodiment (1), wherein the electrodes of the optical module are connected to the equipment side circuit board.

In the above embodiment (2) of the invention, the following modifications and changes can be made.

(vi) The electrodes formed on the back surface of the circuit board are electrically connected to an equipment side electrode formed on a surface of the equipment side circuit board, and wherein a potting comprising a resin is disposed so as to collectively cover the optical element and the semiconductor circuit element mounted on the surface of the circuit board of the optical module and an equipment side element mounted on a surface of the equipment side circuit board.

(3) According to another embodiment of the invention, an optical transmission device comprises the optical modules according to the above embodiment (1) at both end parts of the optical fiber.

Effects of the Invention

According to one embodiment of the invention, an optical module can be provided that can realize further downsizing, as well as an optical communication equipment and an optical transmission device using the optical module.

BRIEF DESCRIPTION OF THE DRAWINGS

The preferred embodiments according to the invention will be explained below referring to the drawings, wherein:

FIGS. 1A-1C are the view schematically showing an optical module according to the embodiment of the invention, and FIG. 1A and FIG. 1B are perspective views schematically showing optical modules, and FIG. 1C is a side view schematically showing the state that said optical module is coupled with an equipment side circuit board;

DETAILED DESCRIPTION OF THE PREFERRED EMBODIMENTS

The embodiment of the invention will be explained below according to the drawings attached.

Figure 2:
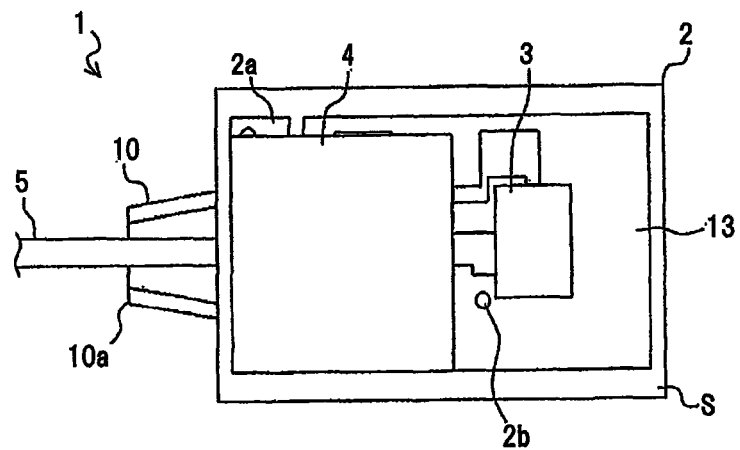
FIG. 2 is a plane view schematically showing an optical module in FIGS. 1A-1C.

FIGS. 1A-1C are the view schematically showing an optical module according to the embodiment of the invention, and FIG. 1A and FIG. 1B are perspective views schematically showing said optical modules, and FIG. 1C is a side view schematically showing the state that said optical module is coupled with an equipment side circuit board. In addition, FIG. 2 is a plane view schematically showing said optical module.

Figure 3A:
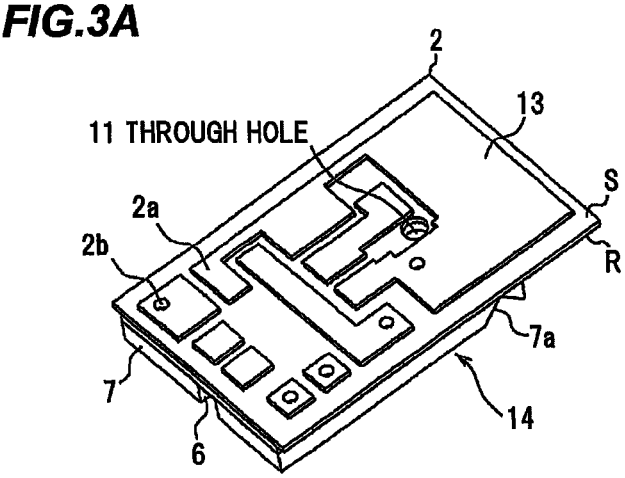
FIG. 3A and FIG. 3B are perspective views schematically showing a circuit board and an optical waveguide used for an optical module in FIGS. 1A-1C.
Figure 3B:
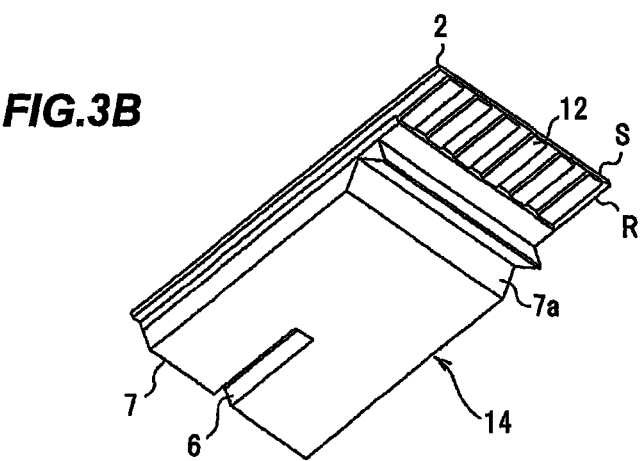

As shown in FIGS. 1A-1C and FIG. 2, the optical module 1 comprises a circuit board 2, an optical element 3 mounted on a surface S of the circuit board 2, a semiconductor circuit element 4 mounted on the surface S of the circuit board 2 and electrically coupled with the optical element 3, an optical connection member 14 formed on a back surface R of the circuit board 2 and having an optical fiber receiving groove 6 (as shown in FIG. 3) to receive (or enclose) a tip end of an optical fiber 5 imported from the end side of the circuit board 2 and optically coupling the optical fiber 5 received in the groove 6 with the optical element 3, and a pressure plate 8 set on the opposite side of the circuit board 2 of an optical waveguide 7 and fixing it in the state that the optical fiber 5 is received in the groove 6.

As is shown in FIG. 3, a double sided wiring flexible printed circuit (FPC), on both surfaces of which wiring patterns 2a are formed, is used as the circuit board 2. The wiring pattern 2a formed on the surface S and the wiring pattern 2a formed on the back surface R are electrically coupled each other via a through hole 2b. In the embodiment of this invention, the circuit board 2 is formed into a rectangle of 3 mm or less on a side, more specifically, not less than 1 mm and not more than 3 mm on a side.

The optical element 3 composed of a surface light emitting element, for example, VCSEL (Vertical Cavity Surface Emitting Laser) etc. or a surface light receiving element, for example, PD (Photo Diode) etc. and the semiconductor circuit board element 4 are mounted on the surface S of the circuit board 2 by flip chip mounting method. As the semiconductor circuit board element 4, in case that the optical element 3 is the light emitting element, a driver IC which drives the light emitting element is used, and in case that the optical element 3 is the light receiving element, then the amplifier IC which amplifies an electrical signal from the light receiving element is used.

In the embodiment of the invention, the optical connection member 14 is formed on the back surface R of the circuit board 2, and is composed of the optical waveguide 7 having the optical fiber receiving groove 6 (as shown in FIG. 3) which encloses a tip part of the optical fiber 5 inserted from the end side of the circuit board 2 and optically coupling the optical fiber 5 enclosed in the optical fiber receiving groove 6 with the optical element 3.

The optical waveguide 7 is formed on the back surface R of the circuit board 2. A through hole 11 which passes a light input or output by the optical element 3 is formed at the position facing a light emitting part or a light receiving part of the optical element 3 in the circuit board 2. In addition, the through hole 11 is optional in case that the circuit board 2 is made of a material which has a transparency to the light of a wavelength used.

The optical waveguide 7 (not shown) is comprised of a core extending parallel to the circuit board 2 along the extension direction of an optical fiber 5 and a clad covering around the core, and is arranged so that a core of an optical fiber 5 and the core of the optical waveguide 7 are optically coupled each other when inserting the optical fiber 5 into the optical fiber receiving groove 6. A V-groove is formed at the position facing a light emitting part or a light receiving part of the optical element 3 in the optical waveguide 7, and the groove has a mirror 7a which inclines 45 degrees for an optical axis of the core of the optical waveguide 7 and reflects a light by using the difference of refractive index between the core of the optical waveguide land the air. By converting the optical axis 90 degrees by the mirror 7a, a light emitting part or a light receiving part of the optical element 3 and the core of the optical waveguide 7 are optically coupled each other. The optical waveguide 7 is formed to extend from the end part of the circuit board 2 to the position facing the optical element 3.

In the optical module 1, an adhesive is filled around the optical fiber 5, and the optical fiber 5 is fixed to the optical fiber receiving groove 6 by curing the adhesive in the state that the optical fiber 5 is pressed by the pressing plate 8. In particular, the processes in assembling the optical module 1 can be simplified by using ultraviolet curing type resin as a stuff of the adhesive and by using a stuff which has a transparency to ultraviolet rays as a stuff of the pressing plate 8 because the adhesive can be cured by irradiating ultraviolet rays in the state that the optical fiber 5 is pressed by the pressing plate 8.

An optical fiber holding member 10 is set at the end part of a circuit board 2 which strongly fixes an optical fiber 5 and controls the damage of an extension part of an optical fiber 5. The optical fiber holding member 10 is formed by processing a metal plate of aluminum, and stainless, etc.

Figure 4:
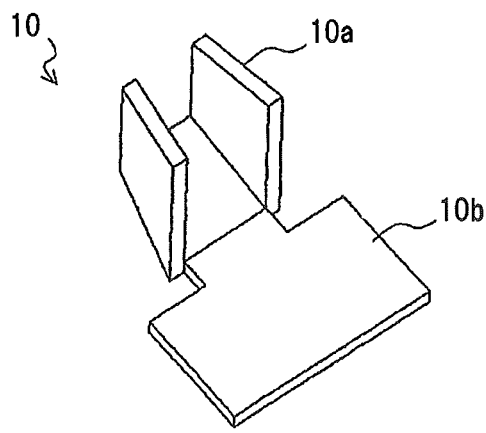
FIG. 4 is a perspective views schematically showing an optical fiber holding member used in an optical module in FIGS. 1A-1C.

As shown in FIG. 4, the optical fiber holding member 10 is composed of an optical fiber holding part 10a, a cross section of which is formed into a U character form so as to cover both sides and an undersurface (the side of the pressing plate 8) of the optical fiber 5, and a fixing part 10b lengthening from an undersurface (the side of the pressing plate 8) of the optical fiber holding part 10a toward a tip of the circuit board 2 and fixed on the opposite surface of the side of the optical waveguide 7 of the pressing plate 8 by the adhesive. The adhesive which has low hardness after cured (a soft adhesive which permits the movement of the optical fiber 5 to some extent after cured) is filled with inside of the optical fiber holding part 10a and is cured, to reduce the damages in the optical fiber 5 because of the concentration of the stress at the extension part of the optical fiber 5 from the optical waveguide 7. The fixing part 10b is formed into like a T character form by expanding the width of the tip part of it, so that the optical fiber holding part 10a is strongly fixed on the surface of the pressing plate 8 by increasing the contact area between the fixing part 10b and the pressing plate 8.

In the optical module 1 according to the embodiment of the invention, the semiconductor circuit element 4 is mounted on the circuit board 2, the position which the semiconductor circuit element 4 is mounted on is nearer to the tip side of the circuit board 2 (the tip side from which the optical fiber 5 is inserted) than the position which the optical element 3 is mounted on, and the optical module 1 is arranged such that the circuit board 2, the optical waveguide 7, and the tip part of the optical fiber 5 are sandwiched between the semiconductor circuit element 4 and the pressing plate 8, and plural electrodes 12 electrically coupled with an equipment side circuit board 21, which is a target for coupling with the optical module 1, are formed on the tip part of the back surface R of the circuit board 2 in a row.

In the embodiment of the invention, six electrodes 12 are provided in a row at equal intervals along the width direction of the circuit board 2, but the number of electrodes 12, the size of intervals etc. are not limited in this case. However, if the length of the electrodes 12 is too large, the entire circuit board 2 will be longer so as to increase the size. The length of the electrodes 12 is desirably as short as possible, and preferably not more than 0.5 mm. In the embodiment, the length of the electrodes 12 is set to be about 0.2 mm and the disposition pitch of the electrodes 12 in the width direction is set to be about 0.16 mm. The total thickness of the optical module 1 is about 0.8 mm in which the semiconductor circuit element 4, the optical element 3, the circuit board 2, the optical waveguide 7, the pressing plate 8 and the optical fiber fixing member 10 are formed sequentially.

In the optical module 1 according to the embodiment of the invention, the optical module 1 is arranged such that the circuit board 2, the optical waveguide 7, and the tip part of the optical fiber 5 are sandwiched between the semiconductor circuit element 4 and the pressing plate 8, so if the difference in coefficient of thermal expansion between the semiconductor circuit element 4 and the pressing plate 8 is large, then there is a possibility of occurring such a trouble, for example, that a curve occurs in the whole optical module 1 and a solder of the optical element 3 or the semiconductor circuit element 4 comes off. Therefore, it is preferable that the coefficients of thermal expansion of the semiconductor circuit element 4 and the pressing plate 8 are set as close as possible, in particular, it is preferable that the difference in coefficient of thermal expansion between the semiconductor circuit element 4 and the pressing plate 8 is not more than 20 ppm. Specifically, as a material of the pressing plate 8, it is preferable to use a glass, for example, a quartz glass the coefficient of thermal expansion of which is close to that of the semiconductor circuit element 4 and has a transparency to ultraviolet rays.

In addition, in the embodiment of the invention, the electrodes 12 are formed on the tip part of the back surface of the circuit board 2 which is opposite to the surface on which the semiconductor circuit element 4 is mounted, so if pushing a probe for inspection to the electrodes 12 when inspecting the optical element 3 or the semiconductor circuit element 4, such a trouble, for example, that the solder of the optical element 3 or the semiconductor circuit element 4 comes off may occur because the optical element 3 or the semiconductor circuit element 4 is hard-pushed to the work top. Therefore, in the embodiment of the invention, an electrode 13 for inspection used for inspecting the optical element 3 or the semiconductor circuit element 4 is formed on the surface S of the circuit board 2 and the inspection is done by pushing a probe for inspection to the electrode 13 for inspection when inspecting. In addition, in the embodiment of the invention, the wiring pattern 2a formed around the optical element 3 and on the tip side of the surface S of the circuit board 2 is formed in large size so as to be easy to push a probe.

An optical transmission device according to the embodiment of the invention is obtained by providing at one end part of the optical fiber 5 the optical module 1 using a light emitting element as the optical element 3 and providing at the other end part of the optical fiber 5 the optical module 1 using a light receiving element as the optical element 3.

In addition, as shown in FIG. 1C, an optical communication equipment 100 according to the embodiment of the invention is obtained by electrically coupling the electrodes 12 of the optical module 1 with the equipment side circuit board 21.

The optical communication equipment 100 is used for a subminiature camera of the industrial use etc. The equipment side circuit board 21 is a circuit board for controlling the optical communication equipment 100 etc. and an equipment side electrode 22 for coupling the electrodes 12 of the optical module 1 is formed at the tip part of the surface thereof. An equipment side element 23 including a semiconductor circuit element which controls the optical communication equipment 100 etc. is mounted on the surface of the equipment side circuit board 21.

The optical communication equipment 100 is constructed by electrically coupling the electrodes 12 formed on the back surface R of the optical module 1 with the equipment side electrode 22 formed on the surface of the equipment side circuit board 21 by a solder etc.

In the embodiment of the invention, a potting 24 of a resin is set so as to cover the optical element 3 and the semiconductor circuit element 4, mounted on the surface S of the circuit board 2 of the optical module 1, and the equipment side element 23 mounted on the surface of the equipment side circuit board 21 together for the purpose of increasing the reliability of the optical module 1 under the high-temperature and high-humidity environment. In case of forming the electrodes 12 on the surface S of the circuit board 2, for example, it isn't possible to set the potting 24 so as to cover the optical element 3 and the semiconductor circuit element 4, and the equipment side element 23 together and hence the potting 24 is needed to be set on both surfaces of the circuit board 2. But in case of forming the electrodes 12 on the back surface R of the circuit board 2, as is formed in the optical module 1, it is possible to locate the optical element 3 and the semiconductor circuit element 4, and the equipment side element 23 on the surface side of the equipment side circuit board 21 together and to set the potting 24 so as to cover these elements together.

Effects of the embodiment of the invention are explained below.

In the optical module 1 according to the embodiment of the invention, the semiconductor circuit element 4 is mounted on the circuit board 2, the position which the semiconductor circuit element 4 is mounted on is nearer to the tip side of the circuit board 2 (on the tip side through which the optical fiber 5 is inserted) than the position which the optical element 3 is mounted on, and the optical module 1 is arranged such that the circuit board 2, the optical waveguide 7, and the tip part of the optical fiber 5 are sandwiched between the semiconductor circuit element 4 and the pressing plate 8, and the plural electrodes 12 electrically coupled with the equipment side circuit board 21, which is a target for coupling with the optical module 1, are aligned on the tip part of the back surface R of the circuit board 2.

In the conventional optical module, the semiconductor circuit element 4 is usually formed as close as possible to the electrodes 12 and is usually formed on the tip side of the optical element 3 (on the side of the electrodes 12) to suppress the deterioration of high-speed electrical signal.

On the other hand, in the optical module 1 according to the embodiment of the invention, it is possible to cut the wasteful space on the circuit board 2 and plan further downsizing of the optical module 1 by mounting the semiconductor circuit element 4 on the tip side of the circuit board 2 of the optical element 3. In addition, in the optical module 1, the length of one side of the circuit board 2 is not more than 3 mm, and such the optical module 1 is extremely smaller than the conventional optical module, so it is possible to reduce the distance between the electrodes 12 and the circuit board 2 and to suppress the deterioration of high-speed electrical signal even when the semiconductor circuit element 4 is mounted on the tip side of the circuit board 2 of the optical element 3.

By the way, a solder etc. is used in coupling the electrodes 12 with the equipment side circuit board 21. But if the optical element 3 exists extremely near to the electrodes 12, a trouble may be occur to the optical element 3 under the influence of heat to be generated at the time of coupling work, such as soldering, etc. In the optical module 1, since the optical element 3 is arranged on the position of the circuit board 2 that is nearer to the tip side (on the side of the electrodes 12) of the circuit board 2 than the semiconductor circuit element 4, the influence of heat to be generated at the time of coupling work to the optical element 3 increases.

Therefore, in the embodiment of the invention, the electrodes 12 are formed on the back surface R of the circuit board 2 which is opposite to the surface on which the optical element 3 is mounted. By this way, it is possible to suppress the deterioration of the optical element 3 caused by heat even if the electrodes 12 are arranged near the optical element 3 in comparison with the case that the electrodes 12 are formed on the surface on which the optical element 3 is mounted, and is possible to plan further downsizing of the optical module 1.

In addition, since the optical module 1 has such a structure that the electrodes 12 are formed on the tip side of the circuit board 2, the optical module 1 can be easy mounted on the equipment side circuit board 21 by soldering etc. Besides, in the optical module 1, the disposition pitch between the electrodes 12 is extremely narrow (e.g. about 0.16 mm) and the length of the electrodes 12 are extremely short (e.g. 0.2 mm), so it is difficult to couple with a connector such as an FPC connector.

The invention is not always limited to the above embodiment, and of course may be carried out by being appropriately modified without departing from the scope thereof.

Figure 5:
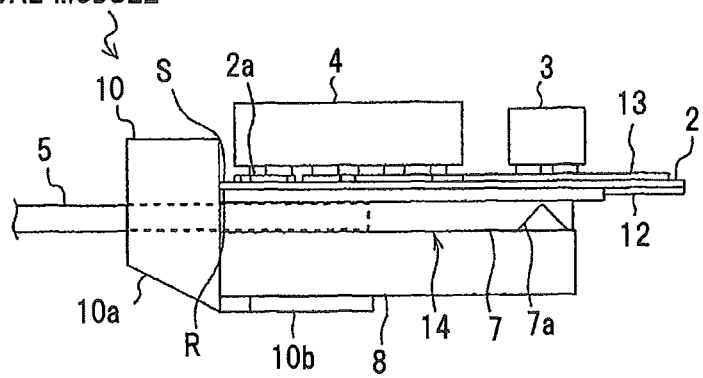
FIG. 5 is a side view schematically showing an optical module according to a modification of the invention.

For example, in the embodiment of this invention, the pressing plate 8 is placed only at the position facing to the semiconductor circuit element 4, but the position of the pressing plate 8 is not limited to this. For example, in an optical module 51 as shown in FIG. 5, it is possible to place the pressing plate 8 extending from the position facing to the semiconductor circuit element 4 (as shown in FIG. 1C) to the position facing to the optical element 3 by enlarging the pressing plate 8 toward the tip side thereof. By placing the pressing plate 8 in this way, it is possible to improve the mechanical strength of the optical module 51.

Figure 6:
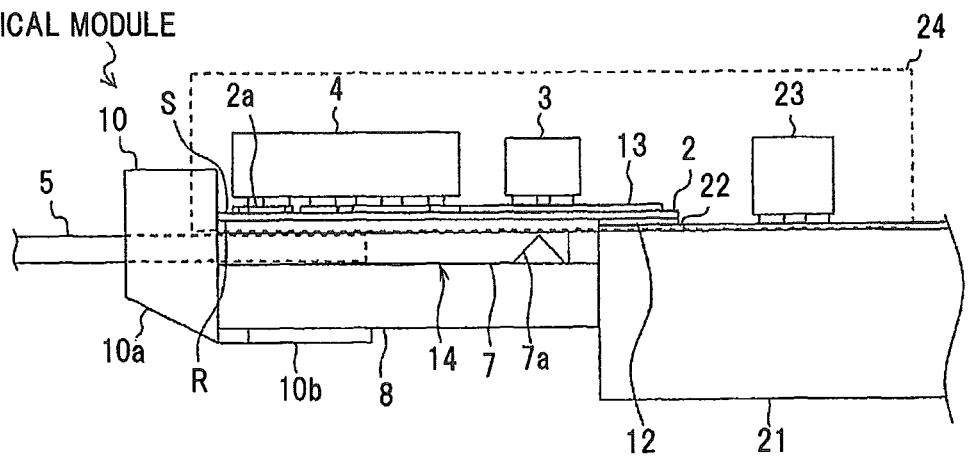
FIG. 6 is a side view schematically showing the state that an optical module according to a modification of the invention is coupled with an equipment side circuit board.

Furthermore, in an optical module 61 as shown in FIG. 6, it may be possible to further extend the pressing plate 8 toward the tip side thereof and place the pressing plate 8 so that the tip surface of the pressing plate 8 contacts the equipment side circuit board 21 in electrically coupling the electrodes 12 with the equipment side circuit board 21. By placing the pressing plate 8 in this way, it is possible to perform easily the alignment of the optical module 61 and the equipment side circuit board 21. In this case, it can be said that the pressing plate 8 plays all roles of fixing the optical fiber 5, improving the mechanical strength of the optical module 51, and positioning of the optical module 61.

What is claimed is:

1. An optical module, comprising:
   a circuit board;
   an optical element mounted on a front surface of the circuit board;
   a semiconductor circuit element mounted on the front surface of the circuit board and electrically connected with the optical element;
   an optical connection member formed on a back surface of the circuit board, the optical connection member including an optical fiber receiving groove to receive a tip of an optical fiber introduced from a base end side of the circuit board and optically connect together the optical fiber received in the optical fiber receiving groove and the optical element; and
   a pressing plate disposed on an opposite side of the optical connection member to the circuit board, the optical fiber receiving groove being open toward the pressing plate, the optical fiber being received and fixed in the optical fiber receiving groove with the pressing plate being pressed directly against the optical fiber,
   wherein the semiconductor circuit element is mounted on the base end side of the circuit board relative to the optical element, and configured in such a manner that the circuit board, the optical connection member and the tip of the optical fiber are sandwiched between the semiconductor circuit element and the pressing plate, and
   wherein the circuit board includes a plurality of electrodes aligned and formed at a tip of the back surface of the circuit board so as to be electrically connected to an equipment side circuit board.

2. The optical module according to claim 1, wherein a difference in a coefficient of thermal expansion between the semiconductor circuit element and the pressing plate is not more than $20 \times 10^{-6}\,C^{-1}$.

3. The optical module according to claim 1, wherein the pressing plate is disposed so as to extend at least from a position facing the semiconductor circuit element to a position facing the optical element.

4. The optical module according to claim 1, wherein the pressing plate is disposed such that a tip surface thereof contacts the equipment side circuit board in electrically coupling the electrodes with the equipment side circuit board.

5. The optical module according to claim 1, wherein the circuit board further comprises an electrode for inspecting the optical element or the semiconductor circuit element formed on a surface thereof.

6. The optical module according to claim 1, wherein the circuit board is formed into a rectangle of not more than 3 mm on a side, and
   wherein a length of the electrode is not more than 0.5 mm.

7. An optical communication equipment, comprising the optical module and the equipment side circuit board according to claim 1, wherein electrodes of the optical module are connected to the equipment side circuit board.

8. The optical communication equipment according to claim 7, wherein the electrodes formed on the back surface of the circuit board are electrically connected to an equipment side electrode formed on a surface of the equipment side circuit board, and
   wherein a potting comprising a resin is disposed so as to collectively cover the optical element and the semiconductor circuit element mounted on the front surface of the circuit board of the optical module and an equipment side element mounted on a surface of the equipment side circuit board.

9. An optical transmission device, comprising the optical modules according to claim 1 at both end parts of the optical fiber.

10. The optical module according to claim 1, wherein the optical connection member includes an optical waveguide to optically connect the optical fiber and the optical element together.

11. The optical module according to claim 10, wherein the optical connection member includes a V-groove, and an inclined surface of that V-groove forms a mirror.

12. The optical module according to claim 1, further comprising an optical fiber holding member comprising:
   an optical fiber holding part that has a U shape to cover the optical fiber; and
   a fixing part that extends from the optical fiber holding part toward the tip of the back surface of the circuit board, the fixing part being fixed to an opposite surface of the pressing plate to the optical connection member.

13. The optical module according to claim 1, wherein the optical connection member comprises an optical waveguide comprising:
   a core extending parallel to the circuit board along an extension direction of the optical fiber; and
   a clad covering around the core, and being arranged so that a core of the optical fiber and the core of the optical waveguide are optically coupled to each other when the optical fiber is inserted into the optical fiber receiving groove.

14. The optical module according to claim 13, wherein a V-groove is formed at a position facing a light emitting part or a light receiving part of the optical element in the optical waveguide.

15. The optical module according to claim 14, wherein the V-groove includes a mirror which reflects a light based on a refractive index of the core of the optical waveguide.

16. The optical module according to claim 15, wherein, by converting an optical axis of the core of the optical waveguide by the mirror, the light emitting part or the light receiving part of the optical element and the core of the optical waveguide optically couple to each other.

17. The optical module according to claim 16, wherein the optical waveguide extends from an end part of the circuit board to the position facing the light emitting part or the light receiving part of the optical element.

18. The optical module according to claim 13, wherein the pressing plate is further pressed directly against the optical waveguide.

19. The optical module according to claim 1, wherein the pressing plate abuts the optical connection member.

20. The optical module according to claim 19, further comprising:
   an optical fiber holding part that covers the optical fiber; and
   a fixing part that abuts the pressing plate and extends from the optical fiber holding part toward the tip of the back surface of the circuit board.

* * * * *